United States Patent
Wu et al.

(10) Patent No.: US 10,262,058 B2
(45) Date of Patent: Apr. 16, 2019

(54) METHOD AND APPARATUS FOR EVALUATING SEARCH PROMPTING SYSTEM

(71) Applicant: TENCENT TECHNOLOGY (SHENZHEN) COMPANY LIMITED, Shenzhen (CN)

(72) Inventors: Zhijian Wu, Shenzhen (CN); Zixuan Zhao, Shenzhen (CN); Yang Liu, Shenzhen (CN); Xu Guo, Shenzhen (CN); Wuquan Qin, Shenzhen (CN); Qiang Li, Shenzhen (CN); Song Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 284 days.

(21) Appl. No.: 15/031,929

(22) PCT Filed: Oct. 9, 2014

(86) PCT No.: PCT/CN2014/088210
§ 371 (c)(1),
(2) Date: Apr. 25, 2016

(87) PCT Pub. No.: WO2015/058615
PCT Pub. Date: Apr. 30, 2015

(65) Prior Publication Data
US 2016/0299964 A1    Oct. 13, 2016

(30) Foreign Application Priority Data
Oct. 24, 2013   (CN) .......................... 2013 1 0541298

(51) Int. Cl.
*G06F 17/30* (2006.01)

(52) U.S. Cl.
CPC .... *G06F 17/30663* (2013.01); *G06F 17/3097* (2013.01); *G06F 17/30867* (2013.01)

(58) Field of Classification Search
CPC ......... G06F 17/30864; G06F 17/30867; G06F 17/3064
(Continued)

(56) References Cited

U.S. PATENT DOCUMENTS

| | | | |
|---|---|---|---|
| 9,009,146 B1 * | 4/2015 | Lopatenko | G06F 17/30867 707/723 |
| 9,098,569 B1 * | 8/2015 | Bhagat | G06F 17/30646 |

(Continued)

FOREIGN PATENT DOCUMENTS

| | | |
|---|---|---|
| CN | 101355457 A | 1/2009 |
| CN | 103207871 A | 7/2013 |
| CN | 103246355 A | 8/2013 |

OTHER PUBLICATIONS

The World Intellectual Property Organization (WIPO) International Search Report for PCT/CN2014/088210 dated Jan. 15, 2015.

*Primary Examiner* — Jay A Morrison
*Assistant Examiner* — Ken Hoang
(74) *Attorney, Agent, or Firm* — Anova Law Group, PLLC

(57) ABSTRACT

The present disclosure discloses a method for evaluating a search prompting system and a corresponding apparatus. The method includes: extracting corresponding assessment terms at random according to an assessment target; acquiring in sequence a minimum number of words that needs to be entered to cover each of the assessment terms; calculating a corresponding coverage efficiency factor and a corresponding prompt efficiency factor according to the minimum number of words that needs to be entered to cover each of the assessment terms, and calculating a coverage rate of each of the assessment terms according to the coverage efficiency (Continued)

factor and the prompt efficiency factor; and performing weighted averaging calculation on the coverage rate of each of the assessment terms, to obtain a coverage rate of the assessment target. In the present disclosure, a coverage efficiency factor and a prompt efficiency factor are further taken into consideration for the calculation of a suggestion coverage rate of an assessment term, so that the evaluation of the effectiveness of a search prompting system can be comprehensively quantified and refined. Therefore, the result of effectiveness evaluation can more accurately reflect the problems of the search prompting system, which enables developers to perform corresponding adjustment, thereby further improving the search prompt efficiency of the search prompting system.

13 Claims, 3 Drawing Sheets

(58) Field of Classification Search
USPC .......... 707/E17.108, E17.014, 999.003, 769, 707/999.005, 723, 999.001, 706, E17.058, 707/741, 765, E17.002, E17.008, 707/E17.017, E17.073, E17.075, E17.08, 707/E17.101, E17.109, 737, 748, 760, 707/999.006, 999.102, E17.005, E17.009, 707/E17.013, E17.016, E17.032, E17.044, 707/E17.061, E17.063, E17.066, E17.069, 707/E17.071, E17.074, E17.078, E17.089, 707/E17.098, E17.1, E17.107, E17.136, 707/634, 705, 707, 710, 721, 722, 728, 707/736, 749, 751, 754, 758, 770, 772, 707/999.002, 999.004, 999.2; 704/251, 704/E15.043, E15.045, 235, E11.002, 704/E13.012, E15.004, E15.014, 10, 254, 704/258, 260, 3, 8, 9

See application file for complete search history.

(56) References Cited

U.S. PATENT DOCUMENTS

| | | | | |
|---|---|---|---|---|
| 2012/0265784 | A1* | 10/2012 | Hsu .................... | G06F 17/3064 707/771 |
| 2012/0296743 | A1* | 11/2012 | Velipasaoglu ..... | G06Q 30/0251 705/14.54 |
| 2014/0201229 | A1* | 7/2014 | Kirazci ............. | G06F 17/30643 707/767 |

* cited by examiner

METHOD AND APPARATUS FOR EVALUATING SEARCH PROMPTING SYSTEM

CROSS-REFERENCE TO RELATED APPLICATIONS

This application is national phase entry under 35 U.S.C. § 371 of International Application No. PCT/CN2014/088210, filed on Oct. 9, 2014, entitled "METHOD AND APPARATUS FOR EVALUATING SEARCH PROMPTING SYSTEM", by TENCENT TECHNOLOGY (SHENZHEN) COMPANY LIMITED, which claims priority to Chinese Patent Application No. 201310541298.2, filed on Oct. 24, 2013. The entire contents of all of which are incorporated herein by reference.

FIELD OF THE TECHNOLOGY

The present disclosure relates to the Internet field, and in particular, to a method and apparatus for evaluating a search prompting system.

BACKGROUND OF THE DISCLOSURE

With the rapid development of the Internet, search products and technologies have gained increasing popularity. Existing search products all have a search prompting function, that is, when a user enters a keyword into a search text box, terms that match the search keyword will appear in a drop-down list below the search text box for the user to select, facilitating the operation of the user.

Therefore, how to design a search prompting system that can maximize user satisfaction and convenience is a difficult problem for developers. In the existing technology, a search prompting system is evaluated by using an evaluation method, for example, according to click through rates of suggested search keywords, where the click through rate is the number of clicks on a keyword in the search prompting system divided by the number of impressions of the keyword in the search prompting system; or according to suggestion coverage rates of suggested search keywords, that is, a proportion of a keyword entered by a user that can be covered in the search prompting system.

However, both the above two evaluation methods have some defects: The implementation of the first evaluation method requires high costs because the number of impressions and the number of clicks of the search prompting system are continuously recorded. Although the second evaluation method is easy to implement, suggestion coverage efficiencies of different keywords vary significantly, making it difficult to obtain an accurate estimated value.

SUMMARY

Embodiments of the present invention provide a method and apparatus for evaluating a search prompting system, to comprehensively quantify and refine the evaluation of the effectiveness of a search prompting system.

Specifically, an embodiment of the present invention provides a method for evaluating a search prompting system, including the following steps: extracting corresponding assessment terms at random according to an assessment target; acquiring in sequence a minimum number of words that needs to be entered to cover each of the assessment terms; calculating a coverage efficiency factor and a prompt efficiency factor according to the minimum number of words that needs to be entered to cover each of the assessment terms, and calculating a coverage rate of each of the assessment terms according to the coverage efficiency factor and the prompt efficiency factor; and performing weighted averaging calculation on the coverage rate of each of the assessment terms, to obtain a coverage rate of the assessment target.

An embodiment of the present invention further provides an apparatus for evaluating a search prompting system, including: an assessment term acquiring module, configured to extract corresponding assessment terms at random according to an assessment target; a search module, configured to acquire in sequence a minimum number of words that needs to be entered to cover each of the assessment terms; a calculation module, configured to: calculate a coverage efficiency factor and a prompt efficiency factor according to the minimum number of words that needs to be entered to cover each of the assessment terms, and calculate a coverage rate of each of the assessment terms according to the coverage efficiency factor and the prompt efficiency factor; and a summarization module, configured to perform weighted averaging calculation on the coverage rate of each of the assessment terms, to obtain a coverage rate of the assessment target.

In the present disclosure, a coverage efficiency factor and a prompt efficiency factor are further taken into consideration for the calculation of a suggestion coverage rate of an assessment term, so that the evaluation of the effectiveness of a search prompting system can be comprehensively quantified and refined. Therefore, the result of effectiveness evaluation can more accurately reflect the problems of the search prompting system, which enables developers to perform corresponding adjustment, thereby further improving the search prompt efficiency of the search prompting system.

The implementation, functional features and advantages of the present invention will be described in further detail through embodiments and with reference to the accompanying drawings.

DESCRIPTION OF EMBODIMENTS

The technical solutions of the present invention will be described in further detail through the accompanying drawings and specific embodiments of this specification. It should be understood that the specific embodiments described herein are merely used to explain the present disclosure, and are not intended to limit the present disclosure.

The present disclosure provides a method for evaluating a search prompting system, to evaluate the effectiveness of a search prompting system. In addition to a suggestion coverage rate of a suggested search keyword, a coverage efficiency factor and a prompt efficiency factor are further introduced, the evaluation of the effectiveness of a search prompting system can be comprehensively quantified and refined. Therefore, the result of effectiveness evaluation can more accurately reflect the problems of the search prompting system, which enables developers to perform corresponding adjustments, thereby further improving the search prompt efficiency of the search prompting system.

The above solutions will be described in detail with reference to embodiments and the accompanying drawings of this specification.

Figure 1:
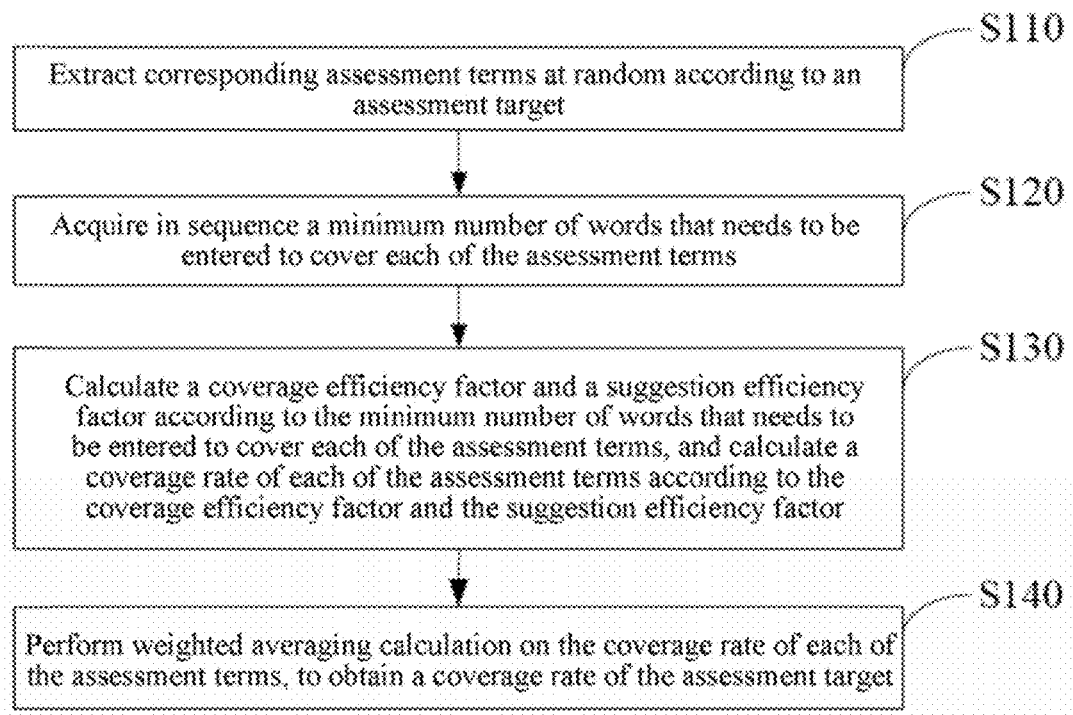
FIG. 1 is a schematic flowchart of a method for evaluating a search prompting system according to the present disclosure.

Referring to FIG. 1, a method for evaluating a search prompting system according to the present disclosure is provided. The evaluation method includes the following steps:

Step S110: Extract corresponding assessment terms at random according to an assessment target.

Specifically, the assessment terms corresponding to the assessment target are obtained by performing sampling from a log collection system, random extraction from a hot list, or random selection from search categories according to the assessment target. If the assessment target is to assess the coverage effectiveness of the search prompting system with respect to popular movies, the assessment terms corresponding to the assessment target may be search keywords about popular movies, for example, Baidu Search Ranking for movies: http://top.baidu.com/category?c=1. Alternatively, the assessment terms corresponding to the assessment target may be search keywords about movie categories. Alternatively, the assessment terms may be sampled from logs in a log collection system that are about popular movies. Multiple assessment terms are extracted, and the number of assessment terms extracted varies with different assessment targets.

Step S120: Acquire in sequence a minimum number of words that needs to be entered to cover each of the assessment terms. The minimum number of words that needs to be entered to cover the assessment term is a minimum number of words that are required in order to enable the corresponding assessment term to be displayed in the result of the search prompting system.

The following uses one assessment term as an example to describe the process of acquiring the minimum number of words that needs to be entered to cover the assessment term. First, the entire assessment term is entered, and it is determined whether a corresponding result can be found. If the search prompting system cannot find the corresponding result after the entire assessment term is entered, it is determined that the search prompting fails. If the search prompting system can find the corresponding result after the entire assessment term is entered, it is determined that the search prompting is successful. Then, provided that the search prompting is successful, the minimum number of words that needs to be entered to cover the assessment term is further determined: characters of the assessment term entered are deleted one by one from right to left, until the search prompting system cannot find the corresponding result, and the minimum number of words that needs to be entered to cover the assessment term is the number of remaining words of the assessment term at this moment plus 1. In this embodiment, the minimum number of words that needs to be entered to cover the assessment term is greater than 0.

Figure 2:
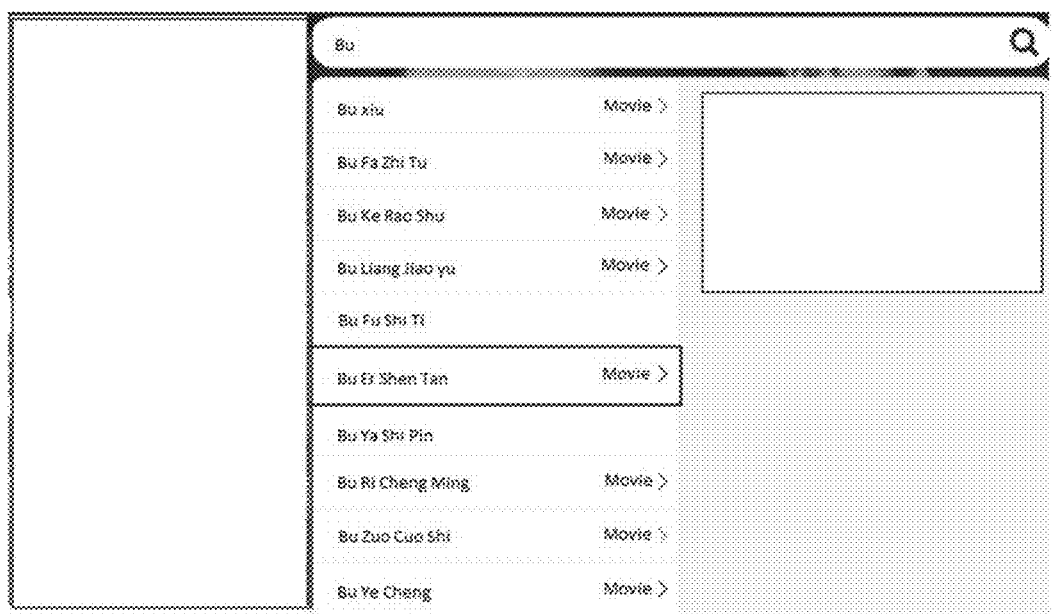
FIG. 2 is a schematic diagram illustrating an operation of acquiring a minimum number of words that need to be entered for an assessment term in the method for evaluating a search prompting system according to the present disclosure.

As shown in FIG. 2, the assessment term is "Bu Er Shen Tan", which has a length of four characters. When a user enters the entire assessment term "Bu Er Shen Tan", the search prompting system can find a corresponding result. Then, the characters of the assessment term are deleted one by one from right to left as described above, and when the user enters only the character "Bu", the corresponding result can be found in the sixth result of the search prompting system. When the user does not enter any character, the corresponding result cannot be found in the search result of the search prompting system. Therefore, the minimum number of words that needs to be entered to cover the assessment term "Bu Er Shen Tan" is 1.

Step S130: Calculate a coverage efficiency factor and a prompt efficiency factor according to the minimum number of words that needs to be entered to cover each of the assessment terms, and calculate a coverage rate of each of the assessment terms according to the coverage efficiency factor and the prompt efficiency factor. The coverage efficiency factor is used to further determine, provided that the search prompting system can cover a search keyword, a length ratio required by the search prompting system to cover the keyword for the first time, and the prompt efficiency factor is used to further determine, provided that the search prompting system can cover a search keyword, the position of a suggestion result when the search prompting system covers the keyword for the first time. The coverage efficiency factor and the prompt efficiency factor can be used to adjust the search coverage rate.

The coverage efficiency factor and the prompt efficiency factor are calculated according to the minimum number of words that needs to be entered to cover the assessment term. Specifically, a method for calculating the coverage efficiency factor is:

coverage efficiency factor=1−(minimum number of words that needs to be entered to cover the assessment term/the number of words in the assessment term)   (formula 1)

Taking the assessment term "Bu Er Shen Tan" for example, the coverage efficiency factor is: 1−¼=0.75.

In this embodiment, a method for calculating the prompt efficiency factor is: performing normalization processing by using the number of clicks of the first result as a reference value. That is, the prompt efficiency factor of each of the search prompting results that cover the assessment term is: the number of clicks corresponding to each search prompting result/the number of clicks of the first search prompting result (formula 2).

Assuming that the distribution of the number of clicks corresponding to each search prompting result of the assessment term is=10:9:8: 7:6:5:4:3:2:1, the prompt efficiency factors corresponding to the positions of the search prompting results are=(10:9:8:7:6:5:4:3:2:1)/10. Based on the above principle, first, in the case of the minimum number of words that needs to be entered to cover the assessment term, the corresponding position of the assessment term in the search prompting results is recorded. For example, there are 10 search prompting results for "Bu Er Shen Tan", the assessment term appears in the sixth search prompting result, the first search prompting result is the topmost result displayed in the search prompting system, the sixth search prompting result is the sixth result displayed in the search prompting system, counted from top to bottom. It can be deduced by analogy that the $N^{th}$ search prompting result is the $N^{th}$ result displayed in the search prompting system, counted from top to bottom. In this embodiment, N is an integer smaller than or equal to 10, and the value of N may vary with different settings of the search prompting system. Next, the number of clicks of the sixth result is acquired, and the number of clicks corresponding to the first search prompting result is also acquired. Then, it is calculated that the prompt efficiency factor for the assessment term "Bu Er Shen Tan" =the number of clicks corresponding to the sixth search prompting result/the number of clicks corresponding to the first search prompting result. Assuming that the distribution of the number of clicks corresponding to each search prompting result of the assessment term is=10:9:8:7:6:5:4:3:2:1, the prompt efficiency factor of the assessment term "Bu Er Shen Tan"=5/10=0.5.

Then, the coverage rate of each of the assessment terms is calculated according to the calculated coverage efficiency factor and prompt efficiency factor:

the coverage rate=the minimum number of words that needs to be entered to cover the assessment term×the coverage efficiency factor model×the prompt efficiency factor model  (formula 3)

Taking the assessment term "Bu Er Shen Tan" for example, the calculated coverage rate is: 1×0.75×0.5=0.375.

It should be noted herein that most search systems provide a default list function, that is, as long as a user moves the mouse cursor to the input box, a default list will pop up, which does not require the user to enter any keyword. The default list may be generated based on the recent overall user attention or the recent click through rates. If the displayed default list contains an assessment term before the assessment term is entered, the minimum number of words that needs to be entered to cover the assessment term is 0. If the minimum number of words that needs to be entered to cover an assessment term is 0, the coverage rate of the assessment term is defined as 1.

Step S140: Perform weighted averaging calculation on the coverage rate of each of the assessment terms, to obtain a coverage rate of the assessment target.

For a same category (for example, movie), multiple randomly sampled assessment terms (for example, "Bian Xin Jin Gang" and "Xiao Shi Dai") may be tested, and the coverage rates of these assessment terms are obtained respectively according to the method described in step S130. The search coverage rate of the system the assessment target with respect to this category is a ratio of the sum of the coverage rates of all the sampled assessment terms to the number of assessment terms, that is, the search coverage rate of the system=Σ(the coverage rate of the assessment term)/the number of assessment terms (formula 4).

For example, three assessment terms, namely, "Bu Er Shen Tan", "Bian Xin Jin Gang" and "Xiao Shi Dai" are sampled. Assuming that the coverage rate of "Bu Er Shen Tan" is 0.375, the coverage rate of "Xiao Shi Dai" is 0.5, and the coverage rate of "Bian Xin Jin Gang" is 1 because "Bian Xin Jin Gang" exists in a default list, the search coverage rate of the system is: (0.375+0.5+1)/3=0.625. The higher the coverage rate is, the stronger the suggestion function of the search prompting system is.

In the present disclosure, a coverage efficiency factor and a prompt efficiency factor are further taken into consideration for the calculation of a suggestion coverage rate of an assessment term, so that the evaluation of the effectiveness of a search prompting system can be comprehensively quantified and refined. Therefore, the result of effectiveness evaluation can more accurately reflect the problems of the search prompting system, which enables developers to perform corresponding adjustment, thereby further improves the search prompt efficiency of the search prompting system.

Figure 3:
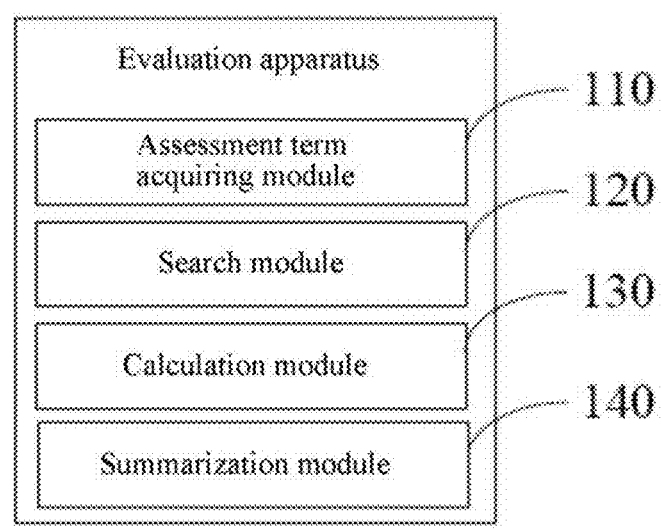
FIG. 3 is a schematic diagram of functional modules of a preferred embodiment of an apparatus for evaluating a search prompting system according to the present disclosure.

Referring to FIG. 3, an apparatus for evaluating a search prompting system according to the present disclosure is provided. The evaluation apparatus includes computer programs stored in memory, one or more processors that execute various computer programs. The evaluation apparatus may include an input module and an output module (not shown in FIG. 3) that can be used by a user or another system to enter data into the apparatus for evaluating a search prompting system and presenting the results of effectiveness evaluations. For example, the input module may include a keyboard, a touch screen monitor, etc., which can be used to enter data. The output module may include a display screen.

The apparatus for evaluating a search prompting system includes an assessment term acquiring module 110, configured to extract corresponding assessment terms at random according to an assessment target; a search module 120, configured to acquire in sequence a minimum number of words that needs to be entered to cover each of the assessment terms; a calculation module 130, configured to: calculate a coverage efficiency factor and a prompt efficiency factor according to the minimum number of words that needs to be entered to cover each of the assessment terms, and calculate a coverage rate of each of the assessment terms according to the coverage efficiency factor and the prompt efficiency factor; and a summarization module 140, configured to perform weighted averaging calculation on the coverage rate of each of the assessment terms, to obtain a coverage rate of the assessment target.

Specifically, the assessment term acquiring module 110 may include various computer programs, when executed by the one or more processors, that can obtain the assessment terms corresponding to the assessment target by performing sampling from a log collection system, random extraction from a hot list, or random selection from search categories according to the assessment target. If the assessment target is to assess the coverage effectiveness of the search prompting system with respect to popular movies, the assessment terms corresponding to the assessment target may be search keywords about popular movies, for example, Baidu Searching Ranking for movies: http://top.baidu.com/category?c=1. Alternatively, the assessment terms corresponding to the assessment target may be search keywords about movie categories. Alternatively, the assessment terms may be sampled from logs in a log collection system that are about popular movies. Multiple assessment terms are extracted, and the number of assessment terms extracted varies with different assessment targets.

Then, the search module 120 include computer programs, when executed by the one or more processors, that can provide search prompting for the assessment terms, so as to acquire the minimum number of words that needs to be entered to cover each of the assessment terms. Specifically, first, the entire assessment term is entered into the search module 120, and it is determined whether a corresponding result can be found. If the search prompting system cannot find the corresponding result after the entire assessment term is entered, it is determined that the search prompting fails. If the search prompting system can find the corresponding result after the entire assessment term is entered, it is determined that the search prompting is successful. Then, provided that the search prompting is successful, the minimum number of words that needs to be entered to cover the assessment term is further determined: characters of the assessment term entered are deleted one by one from right to left, until the search prompting system cannot find the corresponding result, and the minimum number of words that needs to be entered to cover the assessment term is the number of remaining words of the assessment term at this moment plus 1. In this embodiment, the minimum number of words that needs to be entered to cover the assessment term is greater than 0.

The calculation module 130 includes computer programs, when executed by the one or more processors, that can first calculate the coverage efficiency factor and the prompt efficiency factor of each of the assessment terms according to the obtained minimum number of words that needs to be entered to cover the assessment terms, and then calculates the coverage rate of each of the assessment terms according to the coverage efficiency factor and the prompt efficiency factor. For a specific calculation method, reference can be made to the foregoing description of the method embodiment, and the details are not described herein again.

Finally, weighted averaging calculation is performed on the coverage rate of each of the assessment terms, to obtain a coverage rate of the assessment target.

In addition, the apparatus for evaluating a search prompting system as shown in FIG. 3 may include an input module (not shown) and/or an output module (not shown). The input module may be a user terminal that allows a user to enter various search keywords or load keyword logs into the system. The user terminal may also provide an interface with the search prompting system so that a user may run a test of the effectiveness of the search prompting system. The output module may be a display module that presents, through a user interface, the results of the effectiveness evaluation, such as the coverage rate, coverage efficiency factor, and a prompt efficiency factor of the system.

In the present disclosure, a coverage efficiency factor and a prompt efficiency factor are further taken into consideration for the calculation of a search prompt coverage rate of an assessment term, so that the evaluation of the effectiveness of a search prompting system can be comprehensively quantified and refined. Therefore, the result of effectiveness evaluation can more accurately reflect the problems of the search prompting system, which enables developers to perform corresponding adjustment, thereby further improving the search prompt efficiency of the search prompting system.

It should be noted that as used herein, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The sequence numbers of the embodiments of the present invention are merely for the convenience of description, and do not imply the preference among the embodiments.

Through the foregoing description of the implementation manners, it is clear to persons skilled in the art that the present disclosure may be implemented by software plus a necessary universal hardware platform, and certainly may also be implemented by hardware, but in many cases, the software implementation is preferred. Based on such an understanding, the technical solutions of the present invention or the part that makes contributions to the existing technology may be substantially embodied in the form of a software product. The apparatus for evaluating a search prompting system are implemented by means of several instructions. The instructions are stored in a storage medium (for example, a ROM/RAM, a magnetic disk, or an optical disc), and instruct a terminal device (which may be a mobile phone, a computer, a server, or a network device) to perform the method according to the embodiments of the present invention.

The above descriptions are merely preferred embodiments of the present invention, and are not intended to limit the patent scope of the present invention. Any equivalent modification made to the structure or processes based on the content of this specification and the accompanying drawings for direct or indirect use in other related technical fields shall fall be also encompassed in the patent protection scope of the present invention.

What is claimed is:

1. A method for evaluating a search prompting system, comprising:

extracting corresponding assessment terms from the search prompting system according to an assessment target, wherein the assessment terms are previously provided by the search prompting system as candidate search terms for user selection when a user is entering one or more characters of a search keyword;

acquiring in sequence a minimum number of words that needs to be entered to cover each of the assessment terms;

calculating a coverage efficiency factor and a prompt efficiency factor according to the minimum number of words that needs to be entered to cover each of the assessment terms, and calculating a coverage rate of each of the assessment terms according to the coverage efficiency factor and the prompt efficiency factor; and performing weighted averaging calculation on the coverage rate of each of the assessment terms, to obtain a coverage rate of the assessment target, wherein calculating the prompt efficiency factor of an assessment term comprises:

when the minimum number of words that needs to be entered to cover the assessment term is entered in the search prompting system, recording a display position of the assessment term in a search prompting result, wherein the search prompting result includes multiple prompting terms displayed in a specific order in a search suggestion box, and the display position of the assessment term is a rank of the assessment term among the multiple prompting terms based on the specific order;

determining the number of clicks corresponding to the display position of the assessment term in the search prompting result of the assessment term; and determining a ratio between the number of clicks corresponding to the display position of the assessment term and the number of clicks on a prompting term displayed at the first position in the search prompting result as the prompt efficiency factor, wherein calculating the coverage rate of each of the assessment terms comprises:

if the minimum number of words that needs to be entered to cover the assessment term is greater than 0, the coverage rate of the assessment term=the minimum number of words that needs to be entered to cover the assessment term*a coverage efficiency factor model of the assessment term*a prompt efficiency factor model of the assessment term; and if the minimum number of words that needs to be entered to cover the assessment term is equal to 0, the coverage rate of the assessment term=1.

2. The method for evaluating a search prompting system according to claim 1, wherein a method for calculating the coverage efficiency factor is:

1−(the minimum number of words that needs to be entered to cover the assessment term/the number of words in the assessment term).

3. The method for evaluating a search prompting system according to claim 1, wherein the extracting corresponding assessment terms according to an assessment target comprises:
obtaining the assessment terms corresponding to the assessment target by performing sampling from a log collection system or random extraction from a hot list according to the assessment target.

4. The method according to claim 1, wherein the extracted assessment terms belong to a same category corresponding to the assessment target.

5. The method according to claim 1, further comprising:
dividing a sum of the coverage rates of all the extracted assessment terms by a total number of the extracted assessment terms to obtain the coverage rate of the assessment target.

6. An apparatus for evaluating a search prompting system, comprising:
a memory; and
a processor coupled to the memory, the processor being configured to:
extract corresponding assessment terms according to an assessment target;
acquire in sequence a minimum number of words that needs to be entered to cover each of the assessment terms;
calculate a coverage efficiency factor and a prompt efficiency factor according to the minimum number of words that needs to be entered to cover each of the assessment terms, and calculate a coverage rate of each of the assessment terms according to the coverage efficiency factor and the prompt efficiency factor; and
perform weighted averaging calculation on the coverage rate of each of the assessment terms, to obtain a coverage rate of the assessment target,
wherein the processor is further configured to:
when the minimum number of words that needs to be entered to cover the assessment term is entered in the search prompting system, record a display position of the assessment term in a search prompting result, wherein the search prompting result includes multiple prompting terms displayed in a specific order in a search suggestion box, and the display position of the assessment term is a rank of the assessment term among the multiple prompting terms based on the specific order;
determine the number of clicks corresponding to the display position of the assessment term in the search prompting result of the assessment term; and
determine a ratio between the number of clicks corresponding to the display position of the assessment term and the number of clicks on a prompting term displayed at the first position in the search prompting result as the prompt efficiency factor,
wherein in calculating the coverage rate of each of the assessment terms, the processor is further configured to:
if the minimum number of words that needs to be entered to cover the assessment term is greater than 0,
the coverage rate of the assessment term=the minimum number of words that needs to be entered to cover the assessment term*a coverage efficiency factor model of the assessment term*a prompt efficiency factor model of the assessment term; and
if the minimum number of words that needs to be entered to cover the assessment term is equal to 0, the coverage rate of the assessment term=1.

7. The apparatus for evaluating a search prompting system according to claim 6, wherein a method for calculating the coverage efficiency factor is:
1−(the minimum number of words that needs to be entered to cover the assessment term/the number of words in the assessment term).

8. The apparatus for evaluating a search prompting system according to claim 6, wherein the extracting corresponding assessment terms according to an assessment target comprises:
obtaining the assessment terms corresponding to the assessment target by performing sampling from a log collection system or random extraction from a hot list according to the assessment target.

9. The apparatus for evaluating a search prompting system according to claim 6, wherein the processor is further configured to:
divide a sum of the coverage rates of all the extracted assessment terms by a total number of the extracted assessment terms to obtain the coverage rate of the assessment target.

10. A non-transitory computer readable storage medium storing computer programs that, when being executed by a processor, cause the processor to perform:
extracting corresponding assessment terms according to an assessment target;
acquiring in sequence a minimum number of words that needs to be entered to cover each of the assessment terms;
calculating a coverage efficiency factor and a prompt efficiency factor according to the minimum number of words that needs to be entered to cover each of the assessment terms, and calculate a coverage rate of each of the assessment terms according to the coverage efficiency factor and the prompt efficiency factor; and
performing weighted averaging calculation on the coverage rate of each of the assessment terms, to obtain a coverage rate of the assessment target,
wherein calculating the prompt efficiency factor of an assessment term comprises:
when the minimum number of words that needs to be entered to cover the assessment term is entered in the search prompting system, recording a display position of the assessment term in a search prompting result, wherein the search prompting result includes multiple prompting terms displayed in a specific order in a search suggestion box, and the display position of the assessment term is a rank of the assessment term among the multiple prompting terms based on the specific order;
determining the number of clicks corresponding to the display position of the assessment term in the search prompting result of the assessment term; and
determining a ratio between the number of clicks corresponding to the display position of the assessment term and the number of clicks on a prompting term displayed at the first position in the search prompting result as the prompt efficiency factor,
wherein calculating the coverage rate of each of the assessment terms comprises:

if the minimum number of words that needs to be entered to cover the assessment term is greater than 0, the coverage rate of the assessment term=the minimum number of words that needs to be entered to cover the assessment term*a coverage efficiency factor model of the assessment term*a prompt efficiency factor model of the assessment term; and if the minimum number of words that needs to be entered to cover the assessment term is equal to 0, the coverage rate of the assessment term=1.

11. The storage medium according to claim 10, wherein a method for calculating the coverage efficiency factor is:

1−(the minimum number of words that needs to be entered to cover the assessment term/the number of words in the assessment term).

12. The storage medium according to claim 10, wherein the extracting corresponding assessment terms at random according to an assessment target comprises:

obtaining the assessment terms corresponding to the assessment target by performing sampling from a log collection system or random extraction from a hot list according to the assessment target.

13. The storage medium according to claim 10, wherein the computer programs further cause the processor to perform:

dividing a sum of the coverage rates of all the extracted assessment terms by a total number of the extracted assessment terms to obtain the coverage rate of the assessment target.

* * * * *